United States Patent [19]

McClain

[11] 4,329,305

[45] May 11, 1982

[54] PROCESS FOR REGULATING THE PARTICLE SIZE DISTRIBUTION OF SELF-DISPERSING IONICALLY CROSSLINKED THERMOPLASTIC POLYMER

[75] Inventor: Dorothee M. McClain, Cincinnati, Ohio

[73] Assignee: National Distillers & Chemical Corp., New York, N.Y.

[21] Appl. No.: 205,837

[22] Filed: Nov. 10, 1980

[51] Int. Cl.³ .............................................. B01J 2/06
[52] U.S. Cl. ............................................ 264/8; 264/9
[58] Field of Search ................................... 264/5, 8, 9

[56] References Cited

U.S. PATENT DOCUMENTS

| | | | |
|---|---|---|---|
| 3,586,654 | 6/1971 | Lerman et al. | 264/9 |
| 3,674,736 | 7/1972 | Lerman et al. | 264/9 |
| 4,174,335 | 11/1979 | Ohdaira et al. | 260/29.6 RW |
| 4,200,601 | 4/1980 | McClain | 264/9 |
| 4,252,969 | 2/1981 | Broering et al. | 264/9 |

Primary Examiner—James R. Hall
Attorney, Agent, or Firm—Kenneth D. Tremain

[57] ABSTRACT

Powders of self-dispersing ionomer polymer of controlled particle size distribution are obtained by agitating molten resin in admixture with water and in the presence of a particle size distribution regulating amount of acid or base.

8 Claims, No Drawings

PROCESS FOR REGULATING THE PARTICLE SIZE DISTRIBUTION OF SELF-DISPERSING IONICALLY CROSSLINKED THERMOPLASTIC POLYMER

BACKGROUND OF THE INVENTION

1. Field of the Invention

This invention relates to an improvement in processes for producing approximately spherical-shaped self-dispersing ionomer resins and, more particularly, to regulating the particle size distribution of the resin particles.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

It is known from U.S. Pat. No. 4,056,653 that spherical-shaped polymer particles having a rough surface can be prepared by shearing an ionomer resin in a closed shear zone under positive water pressure in the presence of a weak base, i.e., ammonia. The resulting spherical-shaped particles are said to possess an average diameter of from 10 to 100 microns and a packed density of greater than 32 lbs./ft.$^3$. For some applications of dispersed resin powders, it is often desirable to employ a powder size which is less than 10 microns or more than 100 microns.

SUMMARY OF THE INVENTION

It has now been discovered that the average particle size distribution of a self-dispersing ionomer resin can be regulated by dispersing the resin under conditions of rapid mixing in water heated at or above the melting point of the resin in the presence of a minor amount of acid or base. In general, the addition of a small quantity of acid to the dispersion medium provides a dispersed resin having a particle size distribution on the higher end of the scale, e.g., from above about 50 microns to as high as about 500 microns or even higher. Conversely, the addition of base to the dispersion medium generally provides a dispersed resin having a particle size distribution on the lower end of the scale, e.g., from sub-micron level up to about 50 microns.

Briefly stated, the invention herein provides a process for preparing in finely divided form an ionomer polymer of controlled particle size distribution which comprises: (a) agitating a mixture of ionomer polymer while in the molten state, a dispersion-forming amount of water, and a particle size distribution regulating amount of acid or a base; and, (b) cooling the dispersion to below about 100° C. to provide solid particles of resin.

The cooled dispersion of resin powder can be directly employed in various applications or the resin powder can be recovered therefrom using known and conventional procedures such as filtration and centrifugation.

The term "acid" embraces mineral and organic acids, a one molar solution of which will provide a pH of less than about 4. The term "base" includes all inorganic and organic bases, a one molar solution of which will provide a pH of more than about 9.

The term "ionomer polymer" as used herein defines an ionic copolymer of at least 50 mol percent of a monoethylenically unsaturated alpha-olefin of from 2 to 10 carbon atoms, from about 0.2 to about 50 mol percent of an alpha, beta-ethylenically unsaturated carboxylic and/or sulfonic acid having from 3 to 8 carbon atoms, and optionally, other monoethylenically unsaturated comonomers, said copolymers having from 10% to 100% of the carboxylic or sulfonic acid groups in salt form with metal ions uniformly distributed throughout the copolymer. The foregoing copolymers and methods for their preparation are well-known, e.g., as disclosed in U.S. Pat. Nos. 3,264,272 and 3,322,734, both of which are incorporated by reference herein, and various carboxylic acid types are commercially available from E. I. du Pont de Nemours and Co. as the Surlyn ionomer resins.

DESCRIPTION OF THE PREFERRED EMBODIMENTS

The self-dispersing ionomer polymers of this invention are anionic, substantially water-insoluble, random (but occasionally, alternating) copolymers having an average molecular weight of from about 10,000 to 1,000,000 or even higher, and preferably, from about 10,000 to 300,000. The resins can be obtained by copolymerizing a first ethylenically unsaturated compound selected from the group consisting of monoolefins and diolefins of from 2 to 10 carbon atoms, vinyl aromatics, vinyl esters and vinyl ethers, and an alpha, beta-ethylenically unsaturated carboxylic or sulfonic acid of from 3 to 8 carbon atoms to provide a copolymer containing at least 50 mol percent polymerized of the first ethylenically unsaturated compound and from 0.2 to 50 mol percent polymerized alpha, beta-ethylenically unsaturated carboxylic or sulfonic acid, and thereafter reacting the copolymers with an ionizable metal compound which results in a form of thermally reversible ionic crosslinking. Alternatively, the resins can be prepared by graft copolymerizing from about 3 to about 30 weight percent, and preferably from about 5 to about 15 weight percent, alpha, beta-ethylenically unsaturated carboxylic or sulfonic acid on an ethylenic homopolymer or copolymer and crosslinking the resulting resins with ionizable metal compounds. Where the sulfonic acid-containing base resins are concerned, another procedure for preparing the self-dispersing ionomer polymers herein involves introducing in a known manner sulfonic acid groups in an ethylenic homopolymer or copolymer and ionically crosslinking the sulfonated resins with ionizable metal compound.

Monoolefins which can be employed in the formation of the ionomer polymers include ethylene, propylene, butene-1, pentene-1, hexene-1, heptene-1, 3-methylbutene-1, 4-methylpentene-1, and so on. Diolefins which can be used herein include butadiene, isoprene, 2,3-dimethylbutadiene, 2-chlorobutadiene, 2-fluorobutadiene, and the like. Useful vinyl aromatics include styrene, alpha-methyl styrene, vinyl toluene and vinyl naphthalene. Among the vinyl esters which can be used to prepare the ionomer resins are vinyl acetate, vinyl propionate, vinyl butyrate, vinyl trimethylacetate, vinyl pelargonate, vinyl decanoate, vinyl laurate, vinyl palmitate and vinyl stearate. Useful vinyl ether monomers include methyl vinyl ether, ethyl vinyl ether, isopropyl vinyl ether, n-butyl vinyl ether, n-hexyl vinyl ether, n-octyl vinyl ether, and the like.

Among the alpha, beta-ethylenically unsaturated carboxylic acids which can be reacted with the alpha-olefins to form the non-crosslinked copolymers include acrylic acid, methacrylic acid, ethacrylic acid, itaconic acid, maleic acid, fumaric acid, monoesters of dicarboxylic acids such as methyl hydrogen maleate, methyl hydrogen furarate and ethyl hydrogen fumarate and the chemically equivalent acid anhydrides such as maleic anhydride. Vinyl sulfonic acid can be co-polymerized with ethylenically unsaturated monomer(s) to provide the base resins herein; alternatively, sulfonic acid groups can be introduced into an unsaturated ethylenic polymer or copolymer by reacting the latter with acetyl sulfate, or a sulfur trioxide complex of dioxane or tetrahydrofuran or by using any other known sulfonation technique.

Metal ions which are advantageously employed in the formation of the ionically crosslinked copolymers can be selected from among the uncomplexed and complexed ions, as described in U.S. Pat. No. 3,264,272, incorporated herein by reference for the disclosure of suitable metal ions. Examples of useful uncomplexed metal ions are the mono-, di- and trivalent ions of the metals of Groups I, II, III, IV-A and VIII of the Periodic Table of the Elements. Suitable monovalent metal ions are those of sodium, potassium, lithium, cesium, silver, mercury and copper. Suitable divalent metal ions are those of beryllium, magnesium, calcium, strontium, barium, copper, cadmium, mercury, tin, lead, iron, cobalt, nickel and zinc. Suitable trivalent metal ions are those of aluminum, chromium, iron and yttrium. Alkali metal ions are preferred. The crosslinking reaction is preferably carried out by blending the copolymer bases with a sufficient amount of a solution of crosslinking metal compounds calculated to result in neutralization of at least 10 percent of the carboxylic acid groups present in the copolymer chain and separating the resulting crosslinked copolymer.

Acids which are useful herein to control the particle size distribution of the dispersed ionomer polymer include mineral and organic acids, a one molar solution of which provides a pH of less than about 4 and preferably, less than about 2. Among such acids are included the halogen acids, especially hydrochloric acid, sulfuric acid, nitric acid, phosphoric acid, and the alkane and arenesulfonic acids such as methanesulfonic acid, ethanesulfonic acid, benzenesulfonic acid, toluenesulfonic acid, etc.; acetic acid, citric acid, benzoic acid, etc.

Bases which are useful herein to control the particle size distribution of the dispersed ionomer polymer include all inorganic and organic bases which are normally solid or liquid at room temperature and at 1 atmosphere pressure, a one molar solution of which provides a pH of greater than about 9 and preferably, greater than about 11. Among such bases are included the alkali metal hydroxides, especially sodium hydroxide, the alkali metal oxides and carbonates, trisodium phosphate monobasic salt, the alkali metal salts of weak acids, e.g., sodium acetate, and the like.

The particle size-regulating amount of acid or base to be employed in the dispersion is readily determined by routine experimentation. Amounts of acid or base as small as about 0.3 weight parts per 100 weight parts of ionomer polymer will frequently be sufficient to increase or decrease the particle size of the polymer as the case may be.

The temperature of operation is dependent upon the melting point, melt flow properties, decomposition temperature, and desired particle size distribution of the dispersion of the selected ionomer polymer. While the ionomer polymers can be dispersed at temperatures commencing with their respective melting points, increases in dispersion temperature beyond the melting point and up to the decomposition of the resins are generally accompanied by corresponding increases in the fluidity of the molten resins. As the fluidity of the melt increases, the dispersion generally tends to develop lower average particle sizes without requiring increases in agitation effort.

The dispersing apparatus or device may be any device capable of delivering at least a moderate amount of shearing action under elevated temperatures and pressures to a liquid mixture. Suitable, for example, are conventional autoclaves equipped with conventional propeller stirrers. In general, the rate of stirring can vary from about 1200 to about 4000 rpm and preferably from about 1800 to about 3800 rpm. Stirring rates lower than these can be sufficient for a particular dispersion medium and higher rates, while operable, are usually without advantage. The overall recovery yield of dispersed ionomer polymer is to some extent dependent upon the duration of stirring. For a given type and rate of stirring, a period of stirring exists within which maximum recoverable yields of polymer result. Shorter or longer periods of stirring will often result in lower recoverable yields. Preferred stirring periods generally range from about 1 to 60 minutes, and preferably from about 5 to 15 minutes. It will be understood, however, that the stirring rates and periods depend upon the type of equipment utilized.

The temperature for forming the hot aqueous resin dispersion can range from about 100° C. to about 270° C. with temperatures of from about 150° C. to about 250° C. being preferred.

The pressure under which the present process is carried out is so adjusted to exceed the vapor pressure of water at the operating temperature so as to maintain a liquid water phase. More particularly, the pressures may range from about 1 to 217 atmospheres, and preferably from about 6 to 120 atmospheres.

The amount of water used in relation to the ionomer polymer to be dispersed generally ranges from about 0.1 to about 10.0 parts by weight of water per part of normally solid resin. Higher ratios are operable but uneconomical whereas lower ratios, although usable, present operational difficulties. The preferred range is between about 0.2 to about 5.0 parts per part of resin.

The dispersions resulting from the above process are compositions comprising a dispersion of an ionomeric, normally solid synthetic organic polymeric thermoplastic resin in water. If desired, once the dispersion has cooled, its pH can be readjusted to about 7.0 with the addition of acid or base as appropriate. A dispersion prepared in accordance with this invention which is capable of forming a continuous film upon removal of the aqueous phase by evaporation is more definitely termed a latex. The above dispersions or latices can be utilized in coating metal or paper, in polish formulations, in paint formulations, for textile sizing and waterproofing, for coating fibers, etc.

The finely-divided ionomer polymers of this invention are superior in powder form for static or fluidized dip coating, spraying, dusting, and flame spraying applications as well as for preparing stable dispersions in water or some other medium for use in roller, dip, or spray coating. The relatively high molecular weight ionomer polymer powders of this invention also find use in the preparation of heat resistant coatings, in the preparation of molded or formed shapes of powder or slush molding techniques, and in the preparation of foams in combination with conventional blowing agents.

The following examples will further illustrate this invention without limitation. All parts are by weight unless otherwise indicated. In all the examples, a 1 liter Parr autoclave provided with thermometer and stirrer was used for the preparation of the ionomer polymer dispersion. In general, the procedure for making the dispersion called for charging the dispersion components, deionized water, ionomer polymer and particle size distribution regulating agent, to the autoclave and heating the contents of the autoclave to about 200° C. at which point stirring (about 3700 rpm) was begun, and heating was discontinued. After about two minutes of stirring, the autoclave was cooled with stirring being maintained until the temperature equalled or was less than 100° C. In the examples, the ionomer polymer is either duPont's SURLYN 1603 (melt index of 1.7 g./10 min., ASTM method 1238, Condition E) or SURLYN AD 5001. SURLYN 5001 was supplied as a powder, but was roll-milled into a sheet which was subsequently granulated (melt index of 17.9 g./10 min., USI measurement).

EXAMPLE 1

150 g. of SURLYN 1603 ionomer polymer and 450 ml. of deionized water were charged to the Parr autoclave. Following the procedure set forth above, a paste-like dispersion was obtained (Exp. A, Table I). The particle size of the dispersion was determined by means of a Coulter Counter, and by screening (See Exp. A, Table II).

This experiment was then repeated two additional times in which 1.0 and 2.0 ml. of glacial acetic acid, respectively, was added to the charge. (Exps. B and C, Tables I and II). Inspection of this data in Tables I and II reveals that particle size increases as the amount of acetic acid is increased.

TABLE I

| | DISPERSION OF SURLYN 1603 IN THE PRESENCE OF ADDED ACETIC ACID | | | | |
|---|---|---|---|---|---|
| Exp. No. | Glacial Acetic Acid Added to Charge, ml. | pH Initial | pH Final | Degree of Dispersion, % | Appearance of Dispersion |
| A | None (Control) | — | — | 100 | Paste-like; particles elongated, smooth. |
| B | 1.0 | 2.8 | 8 | 100 | Same as in A, but particles appear to be larger than in A. |
| C | 2.0 | 2.4 | 8 | 100 | Particles appear to be even larger than in B. |

TABLE II

PARTICLE SIZE DISTRIBUTION OF SURLYN 1603 DISPERSIONS MADE IN PRESENCE OF ADDED ACETIC ACID

| | Experiments of Table I (Weight Percent) | | |
|---|---|---|---|
| Microns | A (No Acetic Acid) | B (1.0 ml. Acetic Acid) | C (2.0 ml. Acetic Acid) |
| 9.04 | 0.2 | — | — |
| 11.4 | 1.0 | — | — |
| 14.3 | 1.7 | — | — |
| 18.1 | 4.2 | — | — |
| 22.8 | 10.8 | 0.3 | — |
| 28.7 | 27.5 | 3.4 | 1.9 |
| 36.1 | 60.3 | 17.8 | 9.0 |
| 45.1 | 84.4 | 52.6 | 16.8 |
| 57.4 | 94.7 | 86.5 | 25.8 |
| 72.3 | 99.3 | 94.3 | 37.2 |
| 91.1 | 100.0 | 98.2 | 53.0 |
| 114.8 | — | 100.0 | 68.7 |
| 149 | — | — | 100.0 |

EXAMPLE 2

A supply of SURLYN AD 5001 powder was sheeted out on a roll mill and granulated before use in this example. 150 g. of sheeted and granulated SURLYN AD 5001 and 450 ml. of deionized water were charged to the Parr autoclave in each of four different experiments designated D, E, F and G.

In Exp. D, 4.0 g. of sodium hydroxide pellets were also added; in E, 2.0 g. of sodium hydroxide; in F, 0.5 g. of sodium hydroxide, and in G, no sodium hydroxide was added (control experiment). Following the general procedure as set forth above, dispersions were made in each experiment. Table III describes the dispersions produced.

It is apparent from Table III that the general effect of the presence of added alkali during the dispersion process is to decrease particle size. Particles in the submicron range are obtained, as determined by microscopic examination and as evidenced by the blue appearance of the obtained dispersion.

TABLE III

| | DISPERSION OF SURLYN AD 5001* IN THE PRESENCE OF ADDED SODIUM HYDROXIDE | | | |
|---|---|---|---|---|
| Exp. No. | Sodium Hydroxide Added to Charge, g. | pH of Dispersion | Degree of Dispersion, % | Appearance of Dispersion |
| D | 4.0 | 10-11 | ~100** | Very foamy; submicron particles, blue dispersion. |
| E | 2.0 | ~9 | 100 | Very foamy; submicron to micron particles; not quite as blue as D. |

TABLE III-continued

DISPERSION OF SURLYN AD 5001* IN THE PRESENCE OF ADDED SODIUM HYDROXIDE

| Exp. No. | Sodium Hydroxide Added to Charge, g. | pH of Dispersion | Degree of Dispersion, % | Appearance of Dispersion |
| --- | --- | --- | --- | --- |
| F | 0.5 | 8–9 | 100 | Very foamy; submicron to micron particles, but generally larger than in E. |
| G | None (Control) | 7–8 | 100 | Very foamy; submicron to micron particles, more spherical than in F, also slightly larger particle size distribution than before. |

*Sheeted and granulated before use.
**Less a small ring of "fused" polymer, which looked opaque.

What is claimed is:

1. A process for preparing in finely-divided form an ionomer polymer of controlled particle size distribution which comprises:
   (a) agitating a mixture of the polymer while in the molten state and a dispersion-forming amount of water in the presence of a particle size distribution regulating amount of acid or base to provide a hot aqueous dispersion of the polymer;
   (b) cooling the dispersion to provide solid particles of polymer; and
   (c) recovering said solid particles of polymer from the aqueous dispersion to provide said ionomer polymer in finely divided form.

2. The process of claim 1 wherein the ionomer polymer is made by salt-forming with metal ions at least 10% of the acid groups of a copolymer of units derived from an alpha-olefin of the formula $RCH=CH_2$ wherein R is H or alkyl having from 1–8 carbon atoms and from 1.0 to 25 mole percent of units derived from an alpha, beta-ethylenically unsaturated carboxylic acids selected from the class consisting of acrylic acid, methacrylic acid, maleic acid and fumaric acid.

3. The process of claim 2 wherein said alpha-olefin is ethylene.

4. The process of claim 3 wherein said alpha, beta-ethylenically unsaturated carboxylic acid is methacrylic acid.

5. The process of claim 1 wherein the acid has a pKa greater than 5.

6. The process of claim 5 wherein the acid is acetic acid.

7. The process of claim 1 wherein the base is an alkali metal hydroxide.

8. The process of claim 1 wherein the alkali metal hydroxide is sodium hydroxide.

* * * * *